United States Patent [19]

Mäkitalo et al.

[11] Patent Number: 4,502,559
[45] Date of Patent: Mar. 5, 1985

[54] AXLE CONSTRUCTION FOR THE TRACTION WHEELS OF A VEHICLE

[75] Inventors: Seppo Mäkitalo; Erkki Mänttäri, both of Jyväskylä, Finland

[73] Assignee: Valmet Oy, Finland

[21] Appl. No.: 474,185

[22] Filed: Mar. 10, 1983

[30] Foreign Application Priority Data

Mar. 17, 1982 [FI] Finland ................ 820911

[51] Int. Cl.³ .................................. B60K 17/28
[52] U.S. Cl. ............................. 180/75; 180/905
[58] Field of Search ........... 180/70.1, 75, 900, DIG. 1, 180/88, 905

[56] References Cited

U.S. PATENT DOCUMENTS

| | | | |
|---|---|---|---|
| 1,227,378 | 5/1917 | Brady | 180/905 |
| 1,342,634 | 6/1920 | Laycock | 180/75 |
| 1,965,989 | 7/1934 | Parker | 180/75 |
| 3,270,830 | 9/1966 | Barrett | 180/88 |

Primary Examiner—Richard A. Bertsch
Attorney, Agent, or Firm—Steinberg & Raskin

[57] ABSTRACT

An axle construction for the traction wheels of a vehicle, such as a tractor, includes a housing enclosing axle drive or transmission apparatus for driving the shafts to which the traction wheels are mounted and axle components including a pair of axially aligned shafts extending from and coupled to the drive apparatus and a pair of axle bed sleeves coupled to the housing accommodating respective shafts. The axle construction has a symmetrical configuration such that the axle components including the axle bed sleeves in which the shafts are accommodated are symmetrical with respect to both a central longitudinal vertical plane of the vehicle and to a transverse vertical plane passing through the axis of the shafts so that the axle components on both sides of the housing are identical and interchangeable.

5 Claims, 3 Drawing Figures

AXLE CONSTRUCTION FOR THE TRACTION WHEELS OF A VEHICLE

BACKGROUND OF THE INVENTION

The present invention relates generally to vehicles, such as tractors, and more particularly to axle constructions for the traction wheels of vehicles.

An axle construction of a vehicle typically comprises an axle assembly, usually including drive or transmission means for driving shafts to which the traction wheels are mounted, a housing in which the axle assembly is enclosed, traction wheel shafts extending from the drive means and axle supports which are connected either directly or indirectly to the housing.

Axle constructions which are known in the art usually include numerous diverse components which render such axle constructions relatively expensive and complicated in construction. The traction wheel shaft and axle support or bed on one side of the vehicle is usually of a different configuration from the corresponding shaft and support on the other side of the vehicle due to the fact that the vehicle brakes are asymmetric. This also results in relatively high manufacturing costs as well as high costs in connection with the storage and manufacture of spare parts.

SUMMARY OF THE INVENTION

Accordingly, one object of the present invention is to provide a new and improved axle construction for a vehicle which eliminates the drawbacks of conventional axle constructions described above and which are advantageous relative to such known constructions with regard to both manufacturing and storage.

Briefly, in accordance with the present invention, this as well as other objects are attained by providing an axle construction which is symmetrical in construction in that the axle components, such as the axle supports or axle beds which accommodate the traction wheel shafts, which are coupled to the axle housing which enclose, for example, the drive or transmission means, are symmetrical with respect to both the central longitudinal vertical plane of the vehicle as well as with respect to the transverse vertical plane which passes through the axis of the traction wheel shafts, the axle components being identical on both sides of the vehicle and interchangeable with each other. In accordance with the invention, since the axle construction on both the right and left sides of the vehicle are substantially identical and interchangeable, a considerable reduction in all costs associated with the production, storage and delivery of spare parts is achieved.

According to a preferred embodiment of the invention, the axle supports are coupled to the housing by means of respective intermediate members which are themselves constructed symmetrically with respect to both the longitudinal vertical plane of the vehicle as well as the transverse vertical plane which passes through the axis of the wheel shafts and such that the intermediate members are identical on both sides of the axle housing and interchangeable with each other. The intermediate members function to house brake means for the shafts of both of the traction wheels so that the brake means for the vehicle are symmetrical with respect to the longitudinal vertical plane of the vehicle.

Another feature of the preferred embodiment of the invention is that identical fastening lug structure is provided on the underside of each of the intermediate members, each fastening lug structure being symmetrical with respect to the vertical plane passing through the shafts of the traction wheels. The fastening lug structure of each intermediate member preferably comprises a pair of fastening lugs, each fastening lug having a pair of fastening openings formed therein. The fastening openings on one of the fixing lugs may be used, for example, for attaching a three-point lifting attachment of a tractor while the fastening lug located symmetrically on the other side of the shaft axis may be used, for example, for attachment of a traction resistance sensor lever. The fastening lugs situated on the forward side of the transverse plane may also be used as connection points for a vertically and rearwardly adjustable draw-hook or for the attachment of armor plating for the vehicle.

DESCRIPTION OF THE DRAWINGS

A more complete appreciation of the present invention and many of the attendant advantages thereof will be readily understood by reference to the following detailed description when considered in connection with the accompanying drawings in which.

DESCRIPTION OF THE PREFERRED EMBODIMENTS

Figure 1:
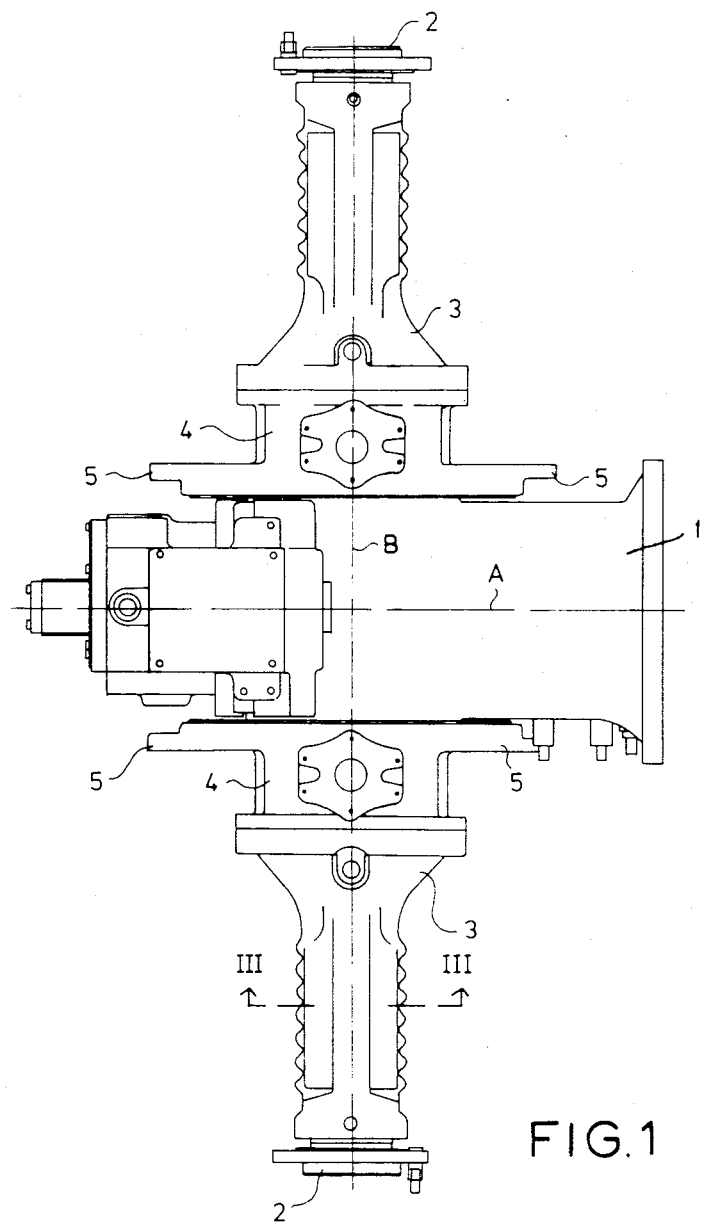
FIG. 1 is a top plan view of an axle construction according to the present invention, the illustrated embodiment constituting the rear axle construction of a tractor.

Referring now to the drawings wherein like reference characters designate identical or corresponding parts throughout the several views and more particularly to FIG. 1, the front part of the tractor is situated on the right-hand side of the axle construction illustrated in FIG. 1. The axle construction includes a housing 1 constituting a part of the frame structure of the tractor and which encloses the speed changing gears and differential gear assembly for driving the shafts of the axle construction. A central longitudinal vertical plane of the vehicle is designated A and a transverse vertical plane passing through the axis of the shafts of the axle construction is designated B. Symmetrically disposed on both sides of the housing 1 are identical intermediate members 4 and identical axle supports in the form of axle bed sleeves 3. Thus, a pair of axially aligned shafts 2 to which the traction wheels (not shown) of the tractor are mounted extend from and are coupled to the drive means situated within housing 1 and are themselves supported by a respective pair of axle supports in the form of the axle bed sleeves 3 which are coupled to the housing 1 through the intermediate members 4.

The vehicle brakes are situated within the intermediate members 4 on both sides of plane A.

Figure 2:
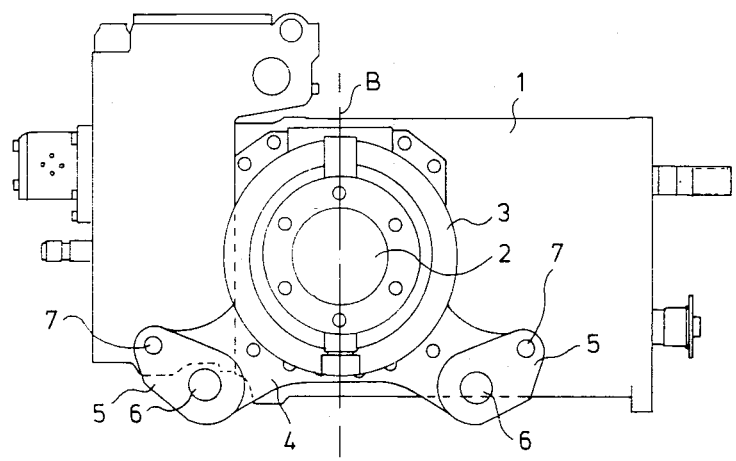
FIG. 2 is a side elevation view of the axle construction of FIG. 1.
Figure 3:
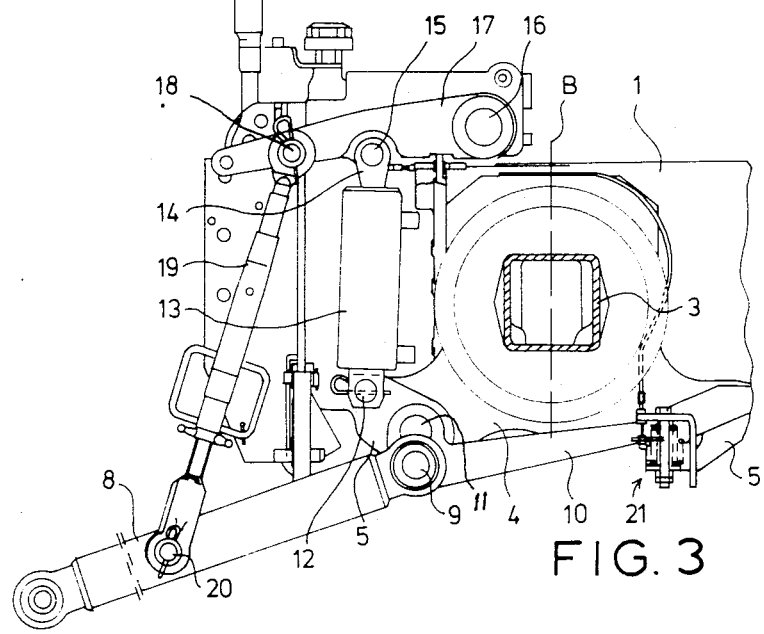
FIG. 3 is a section view taken along line III—III of FIG. 1 and illustrating the installation of a three-point lifting arm arrangement.

Referring to FIGS. 1-3, fastening lug structure are provided on the underside of each of the intermediate members 4, the fastening lug structure of each intermediate member including a pair of fastening lugs 5 so that a total of four fastening lugs are present in the illustrated axle construction.

As noted above and as is clear from the drawings, the intermediate members 4 and the axle bed sleeves 3 are symmetrical with respect to both the vehicles central longitudinal plane A and the transverse plane B. Accordingly, it is only necessary in the production of the vehicle to manufacture a single type of intermediate member 4 and a single type of axle bed sleeve 3, these members being usable in the axle construction on either side of the vehicle.

Referring now to FIG. 2 wherein the rear axle construction is illustrated in elevation, it is clear that the axle bed sleeve 3 and intermediate member 4 are symmetrical with respect to the transverse plane B which is parallel to the axis of the shafts 2. The fixing lug structure on the intermediate member 4 comprises a pair of fastening lugs 5, each fastening lug 5 having a pair of fastening openings 6 and 7 in precisely equivalent locations with respect to the plane of symmetry B.

Referring now to FIG. 3, the identical axle construction illustrated in FIG. 2 is shown with the three-point lifting arm arrangement installed thereon. A lower lifting arm 8 is pivotally attached to a lever 10 by a bearing 9, the lever 10 being attached to a traction resistance sensor 21. The lever 10 in turn is pivotally mounted by bearing 11 to the rear fastening lug 5. The bearing 11 is carried in the opening 6 of the rear, i.e., left-side in FIG. 3, fastening lug 5. A hydraulic lifting cylinder 13 is fastened to the other fastening opening 7 of the same fixing lug 5 by means of an axle pin 12. The end of the piston 14 of the hydraulic cylinder 13 is attached by an axle pin 15 to the lever 17 which is pivotally carried in the frame by bearing 16. The lifting rod 19 is pivotally connected to lever 17 by pin 18 while the lifting rod 19 is in turn attached at its opposite end to the lifting arm 8 by the pin 20. By virtue of the above-described construction, when the arm 8 is lifted, the piston 14 of the hydraulic cylinder 13 will move upwardly. The forward fastening lug 5 of the intermediate member 4 shown on the right-side of the plane of symmetry B in FIG. 2 is utilized in the three-point lifting mechanism of FIG. 3 in that the traction resistance sensor 21 is connected to the fastening opening 6 thereof.

Obviously, numerous modifications and variations of the present invention are possible in the light of the above teachings. For example, the axle construction comprising the axle bed supports and fastening lugs may be of another kind than as shown in the illustrated embodiment. What is essential in the present invention is that the axle construction is symmetrical as described above so that the same components can be used on both sides of the longitudinal plane in its construction. Accordingly, it will be understood that the details of the invention may vary within the scope of the claims appended hereto.

What is claimed is:

1. An axle construction for the traction wheels of a vehicle, such as a tractor, comprising:
   a housing having opposite transverse sides enclosing drive means for driving shafts of said axle construction;
   axle components including a pair of axially aligned shafts coupled to said drive means and extending from respective opposed sides of said housing, each shaft adapted to have a traction wheel mounted thereon, a pair of axle supports coupled to respective opposed sides of said housing, each axle support accommodating a respective one of said shafts and comprising an elongate axle bed sleeve in which a respective shaft is situated, and a pair of intermediate members, each intermediate member being connected to a respective one of said opposed sides of said housing between a respective axle bed sleeve and said housing so that each of said respective axle bed sleeves is coupled to a respective side of said housing by means of a respective intermediate member; and wherein
   said axle construction has a symmetrical configuration such that said axle components including said elongate axle bed sleeves accommodating said shafts and said intermediate members are symmetrical with respect to both a central longitudinal vertical plane of the vehicle and to a transverse vertical plane passing through the axis of said shafts, said axle bed sleeves and intermediate members on both transverse sides of said housing being identical and interchangeable.

2. The combination of claim 1 wherein each of said intermediate members includes fastening lug structure comprising at least two fastening lugs and wherein an equal number of fastening lugs are provided on each side of said transverse vertical plane passing through the axis of said shafts, and wherein said fastening lug structure of each intermediate member is symmetrical with respect to said transverse vertical plane.

3. The combination of claim 2 wherein said fastening lugs are formed on an underside of respective ones of said intermediate members.

4. The combination of claim 2 wherein said fastening lug structure of each intermediate member comprises a pair of fastening lugs, each fastening lug having a pair of fastening openings formed therein.

5. The combination of claim 1 further including brake means for said traction wheel shafts, said brake means being symmetrical with respect to said longitudinal vertical plane of the vehicle and being housed within said intermediate members.

* * * * *